No. 859,856. PATENTED JULY 9, 1907.
C. E. TITUS.
VEHICLE TIRE.
APPLICATION FILED JAN. 11, 1907.
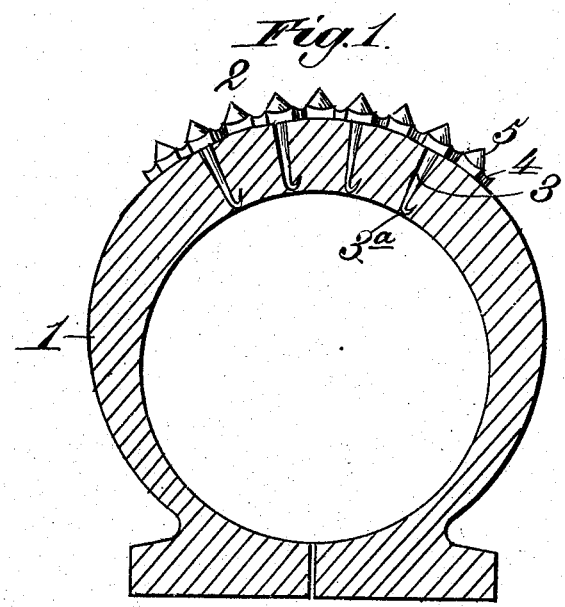
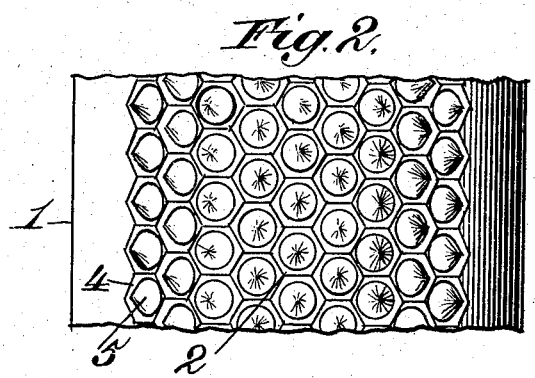
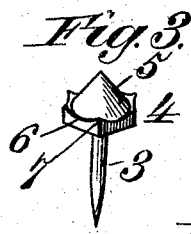 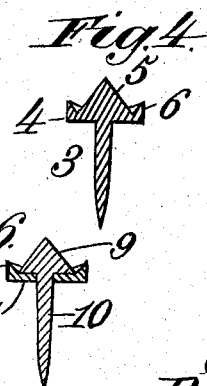 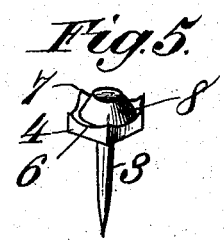
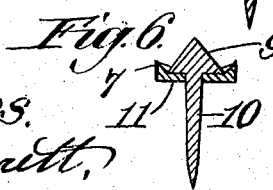
Witnesses.
Robert Everitt,
F. B. Keefer
Inventor.
Charles E. Titus.
By James L. Norris.
Atty.

UNITED STATES PATENT OFFICE.

CHARLES E. TITUS, OF SPRINGFIELD, MASSACHUSETTS.

VEHICLE-TIRE.

No. 859,856.　　　　Specification of Letters Patent.　　　　Patented July 9, 1907.

Application filed January 11, 1907. Serial No. 351,893.

*To all whom it may concern:*

Be it known that I, CHARLES E. TITUS, a citizen of the United States, residing at Springfield, in the county of Hampden and State of Massachusetts, have invented new and useful Improvements in Vehicle-Tires, of which the following is a specification.

This invention relates to pneumatic or cushion tires for vehicles in which the propelling force is applied directly from the axle to the tread of the wheel or wheels; and the object thereof is to provide a tire with means, as hereinafter set forth, which acts as an armor for the tread of the tire, increases the life thereof, preventing the puncturing thereof and also overcomes any liability of the tire skidding or side slipping, whether the vehicle be driven at a racing or at a moderate speed.

With the foregoing and other objects in view the invention consists of the novel construction of tire tread as hereinafter set forth and illustrated in the accompanying drawings, wherein is shown the preferred embodiment of the invention, but it is to be understood that changes, variations and modifications can be resorted to which come within the scope of the claims hereunto appended.

In describing the invention in detail reference is had to the accompanying drawings, wherein like characters denote corresponding parts throughout the several views, and in which—

Figure 1 is a transverse section of a tire having a tread in accordance with this invention. Fig. 2 is a top plan view of a portion of a tire showing the tread. Fig. 3 is a perspective view of one of the elements of the tread. Fig. 4 is a sectional view of a tread element, and, Figs. 5 and 6 are respectively perspective and sectional views of modified forms of tread element.

Referring to the drawings by reference characters 1 denotes a pneumatic or inflated tire having a metallic tread 2 formed from a plurality of abutting tread elements. The tread element as shown in Fig. 3 consists of a tapering shank 3 adapted to engage in the tire, clenched at its inner end as at 3ᵃ (in a manner as shown in Fig. 1), and at its outer end terminates in a head 4 which is substantially hexagonal in contour with the upper face depressed in a cup-like manner.
The element further comprises a conical protuberance 5 arranged centrally of the upper face and which is surrounded by the wall 6 of the depression. The top edge of the wall 6 is scolloped so as to provide a series of projections 7 which surround the protuberance 5 at a point removed therefrom. The function of the protuberance 5 is to enter the ground so as to prevent skidding or side slipping of the tire and the projections 7 also perform a like function when the protuberance 5 is worn away. The curved wall of the depression and
the shape of the protuberance 6 will cause a nail or other article to be guided to the bottom of the depression and consequently owing to the metallic head of the element the tire will be prevented from puncturing and in other cases the shape of the protuberance and the curved wall of the depression will tend to throw off the nail, tack or other object from which there would be liability of puncturing the tire.

To the periphery of the tire is secured a series of tread elements, and owing to the shape of the heads of the elements they will closely abut against each other leaving no space as shown in Fig. 2 so that a substantially solid metallic tread extending entirely around the circumference of the tire will be provided, and, owing to disposing throughout the circumference of the tire, the conical protuberances it will be evident that the tire will be prevented from skidding or side slipping.

In Fig. 5 a modified form of tread element is shown and it consists in forming the protuberance 8 of truncated cone shape; otherwise than that as stated the construction of the tread element is the same as that shown in Fig. 3, the same reference characters being applied thereto. The protuberances 5 are used for racing purposes, whereas the protuberance 8 is for general use as it has a greater wearing surface, or rather used for moderate speed.

It is evident from the foregoing construction of tire that a puncture-proof, as well as a flexible cushion or pneumatic tire is set up, and, furthermore, the construction of the tire will prevent the skidding or side slipping thereof whether the tire be used for racing purposes or at moderate speed, and it is thought the many advantages of such construction of pneumatic tire can be thoroughly understood, especially in view of the fact that the life of the tire is increased and accidents owing to the skidding or side slipping of the tire are prevented.

Fig. 6 illustrates a construction of tread element formed of two sections, one comprising a protuberance 9 and a shank 10 and the other consisting of a head 11 having an opening through which the shank extends. This construction vastly facilitates the positioning of the tread elements properly upon the periphery of the tire, and in this connection it will be stated that a plurality of heads can be arranged in an abutting position after which the shanks are driven home. Or in other words the plurality of heads can be secured upon the periphery of the tire, then all that is necessary to do to position additional heads is to place such heads in an abutting position against those tread elements which have been secured in position and then drive the shanks home. There is no possibility of creating intervening spaces between the tread elements if the construction shown in Fig. 6 is employed as the separate heads allow of the abutting of one with the other before the shank is driven home, and, consequently, the form of tread element shown in Fig. 6 can be positioned more quickly in an accurate manner than the integral construction shown in Figs. 1 to 5. Otherwise than that stated, the construction of tread element in Fig. 6 is the same as that shown in Fig. 3 the same reference characters being applied thereto.

What I claim is—

1. A pneumatic tire having secured to its periphery a plurality of abutting tread elements, each of said elements consisting of a shank, a head provided with a depression, a protuberance extending from the head, and a plurality of projections formed on the head and surrounding the protuberance.

2. A tread element for pneumatic tires, consisting of a shank, a head provided with a depression, a protuberance extending from the head, and a plurality of projections formed on the head and surrounding the protuberance.

In testimony whereof I have hereunto set my hand in presence of two subscribing witnesses.

CHARLES E. TITUS.

Witnesses:
M. EAGAN,
W. A. KIDDER.